L. LONIER.
AUTOMOBILE LAMP SUPPORT.
APPLICATION FILED MAY 20, 1915.
1,176,913. Patented Mar. 28, 1916.
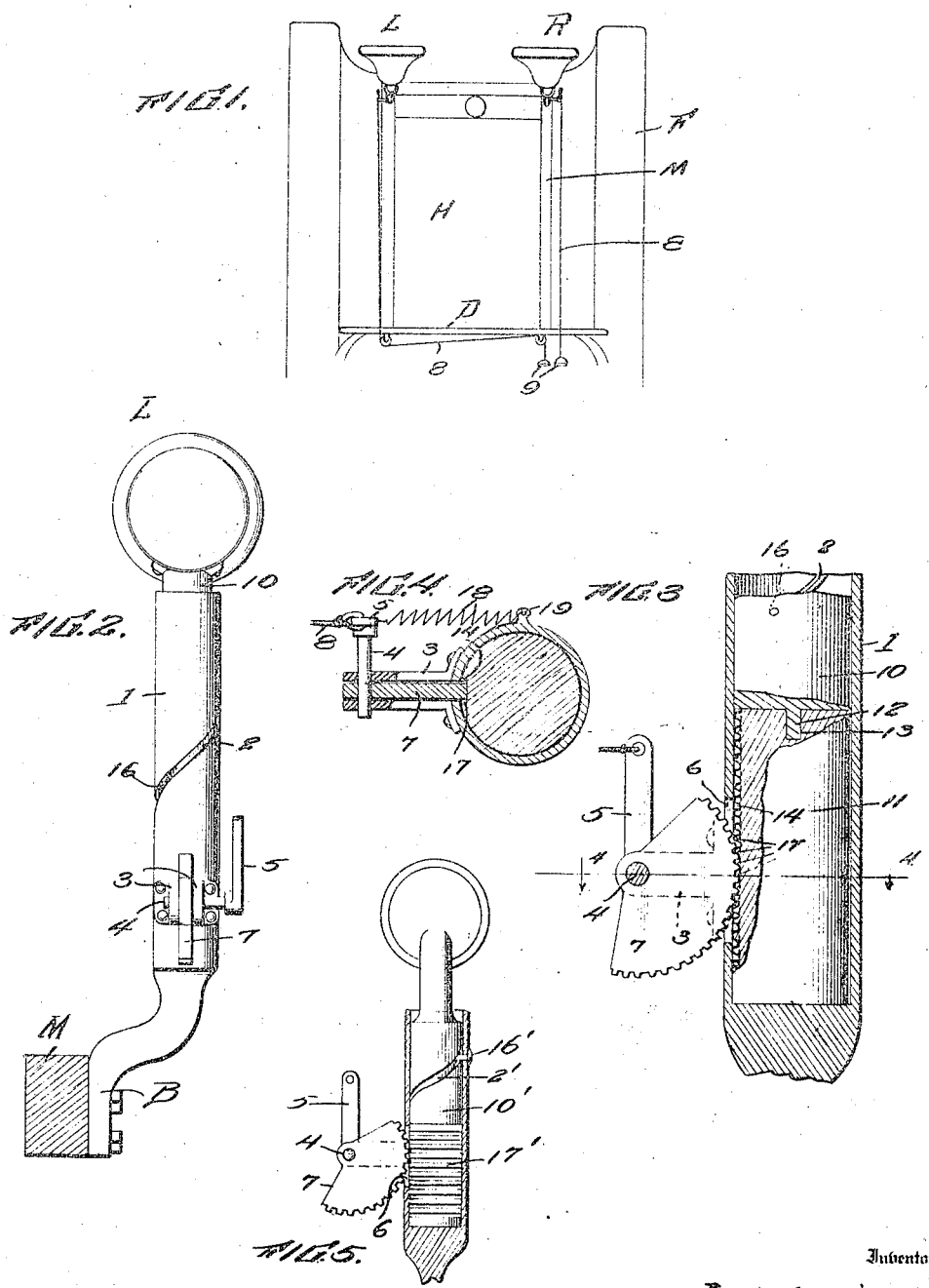
Inventor:
Louis Lonier,
Witnesses:
By Mason Fenwick & Lawrence
Attorneys.

UNITED STATES PATENT OFFICE.

LOUIS LONIER, OF MANCHESTER, MICHIGAN.

AUTOMOBILE-LAMP SUPPORT.

1,176,913.  Specification of Letters Patent.  Patented Mar. 28, 1916.

Application filed May 20, 1915. Serial No. 29,386.

*To all whom it may concern:*

Be it known that I, LOUIS LONIER, a citizen of the United States, residing at Manchester, in the county of Washtenaw and State of Michigan, have invented certain new and useful Improvements in Automobile-Lamp Supports; and I do hereby declare the following to be a full, clear, and exact description of the invention, such as will enable others skilled in the art to which it appertains to make and use the same.

This invention relates to illumination, and more especially to dirigible light supports; and the object of the same is to produce a support for automobile headlights by means of which the driver can turn either lamp outward at will to light up an object alongside his machine or a curve in the roadway around which he proposes to travel.

A further object is to provide for normally housing the lamps between the hood and fender where they are well protected from injury but in which position they can project light straight forward.

These objects are carried out in the manner hereinafter described and claimed, and as shown in the drawings wherein:—

Figure 1 is a plan view of the forward part of an automobile equipped with my invention. Fig. 2 is a front elevation of one of my improved lamp supports, Fig. 3 a vertical section thereof, and Fig. 4 a cross section on the line 4—4 of Fig. 3. Fig. 5 is a vertical section of a slight modification.

In Fig. 1 of the drawings I have shown the hood H forward of the dash D of an automobile, the main frame M appearing at either side of the hood and the fenders F next outside the frame; and left and right lamps are herein indicated by the letters L and R. I prefer to mount them on supports so that each stands between the hood and one fender where it is well protected from injury but may light up the roadway ahead of the machine.

The improved support forming the subject-mater of the present invention includes any suitable type of bracket B secured to the frame M, and an upright tubular standard 1 carried by said bracket, this standard being provided with a spiral slot 2 and with brackets 3 in which is journaled a shaft 4 having a crank 5. Between said brackets the standard is also provided with an upright slot 6 through which projects the toothed edge of a gear or sector 7 which is mounted fast on shaft 4. The rotation of this sector is to be controlled by the operator manually, and therefore the controlling mechanism must lead back behind the dash. As perhaps the simplest form of control I have shown cords 8 connected with the cranks 5 and led back to handles 9, and if the latter are near the driver one cord will have to be passed over the pulleys as shown. However, I do not wish to be limited with respect to the form of control mechanism employed.

Mounted loosely within the standard is a cylindrical rod constituting the lamp post 10, the lamp L being secured to the upper end of this rod in any suitable manner and standing above the standard 1. As best seen in Fig. 3 the post is divided into two parts, its lower portion 11 being disposed in the lower end of the socket within the standard 1 and swivelly connected with its upper portion as by means of a pin 12 in the lower end of the latter loosely engaging a socket 13 in the upper end of the lower portion 11. At its rear side the latter has an upright channel 14 into which the toothed edge of the sector 7 projects, and the bottom of this channel is provided with teeth 17 engaging those on the sector as shown. A pin 16 projects from the upper portion 10 of the post through the spiral slot 2 in the standard.

In the modification shown in Fig. 5 the post 10' is all in one piece and is itself provided with a spiral slot 2', the pin 16' is in the standard 1 and projects inward into said slot, and the lower end of the post is provided with annular grooves constituting teeth 17' which are engaged by said sector 7. In other words, this modification does away with the swivel connection between the two parts of the post and produces a device which is simpler and yet quite as effective as that first above described.

In use, assuming that the automobile is progressing forward along a straight road and the driver desires to turn off on a road which leads to the right, he grasps the right hand handle 9 and draws upon it, and the result is that the right hand sector 7 is turned so that the lower portion 11 of this post is raised straight upward as the channel 14 necessitates. This lifts the upper portion 10, and its pin 16 traveling in the spiral slot 2 causes this portion to revolve slightly, as is permitted by the swivel connection 12, 13. By the time the lamp R has been raised above the right fender F it is turned a little outward or to the right, and the driver by pulling further on the operating mechanism can raise the lamp higher and turn it outward still farther. When he releases his hold thereon, the parts drop back to their initial position and the lamp is well protected from injury. The same operation takes place with the left hand lamp except that it is turned to the left and the same result occurs with the modification shown in Fig. 5, excepting that here as in the other case the direction of the spiral slot must conform with the right or left lamp on the machine, according as the device is used.

I have employed Fig. 4 to show how a coiled contractile spring 18 could connect the lever 5 with a point 19 on the standard 1, so that this spring would take up the slack in the cord 8 if the lamp and post were not heavy enough to do so.

What I claim is:

1. In an automobile lamp support, the combination with an upright tubular standard having an upright slot, a lamp-carrying post mounted in said standard and having teeth opposite said slot, and means for causing the post to make a partial rotation as it is raised within the standard; of a gear having teeth projecting through said slot, and means for turning the gear.

2. In an automobile lamp support, the combination with an upright tubular standard having a slot near its lower end, a post mounted in said standard and having teeth opposite said slot, and means for causing the post to make a partial rotation as it is raised within the standard; of a lamp carried by the upper end of the post, a sector mounted in bearings on said standard and projecting through its slot, and means for turning the sector.

3. In an automobile lamp support, the combination with an upright tubular standard having a slot near its lower end, a post mounted in said standard and having teeth opposite said slot, and a pin in one of said members engaging a spiral groove in the other; of a lamp carried by the upper end of the post, a sector mounted on bearings on said standard and projecting through its slot, and operating mechanism leading to a remote point for turning said sector.

4. In an automobile lamp support, the combination with an upright tubular standard having a spiral slot in its upper portion and a vertical slot in its lower portion, brackets on said standard at opposite sides of the vertical slot, a crank shaft journaled in said brackets, operating mechanism connected with its crank, and a sector fast on the shaft and projecting through said upright slot; of a two-part post mounted in said standard and with the lower part having a channel opposite said vertical slot, teeth in the bottom of said channel engaging those on the sector, a pin in the upper part engaging said spiral slot, and a swivel connection between the meeting ends of said parts.

5. In an automobile lamp support, the combination with an upright tubular standard having a spiral slot in its upper portion and a vertical slot in its lower portion, brackets on said standard at opposite sides of the vertical slot, a crank shaft journaled in said brackets, operating mechanism connected with its crank, and a sector fast on the shaft and projecting through said upright slot; of a two-part post mounted in said standard and with the lower part having teeth engaging those on the sector, a pin in the upper part engaging said spiral slot, and a socket in its upper end, and a pin in the lower end of the upper part loosely seated in said socket.

In testimony whereof I affix my signature in presence of two witnesses.

LOUIS LONIER.

Witnesses:
F. M. FREEMAN,
CHAS. HOFFER.